Figure 4:
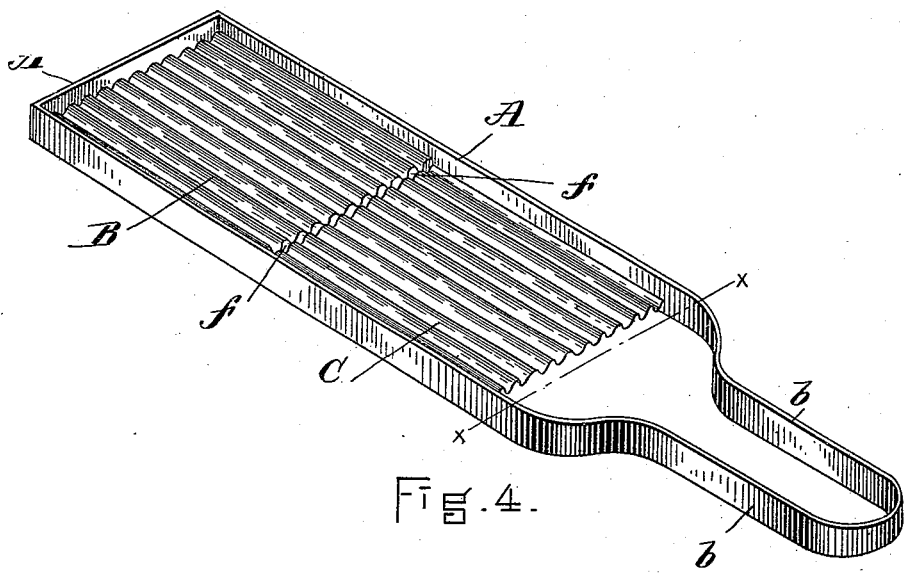

(No Model.) 2 Sheets—Sheet 1.
C. H. DANA.
FRUIT AND VEGETABLE CUTTER.
No. 446,379. Patented Feb. 10, 1891.
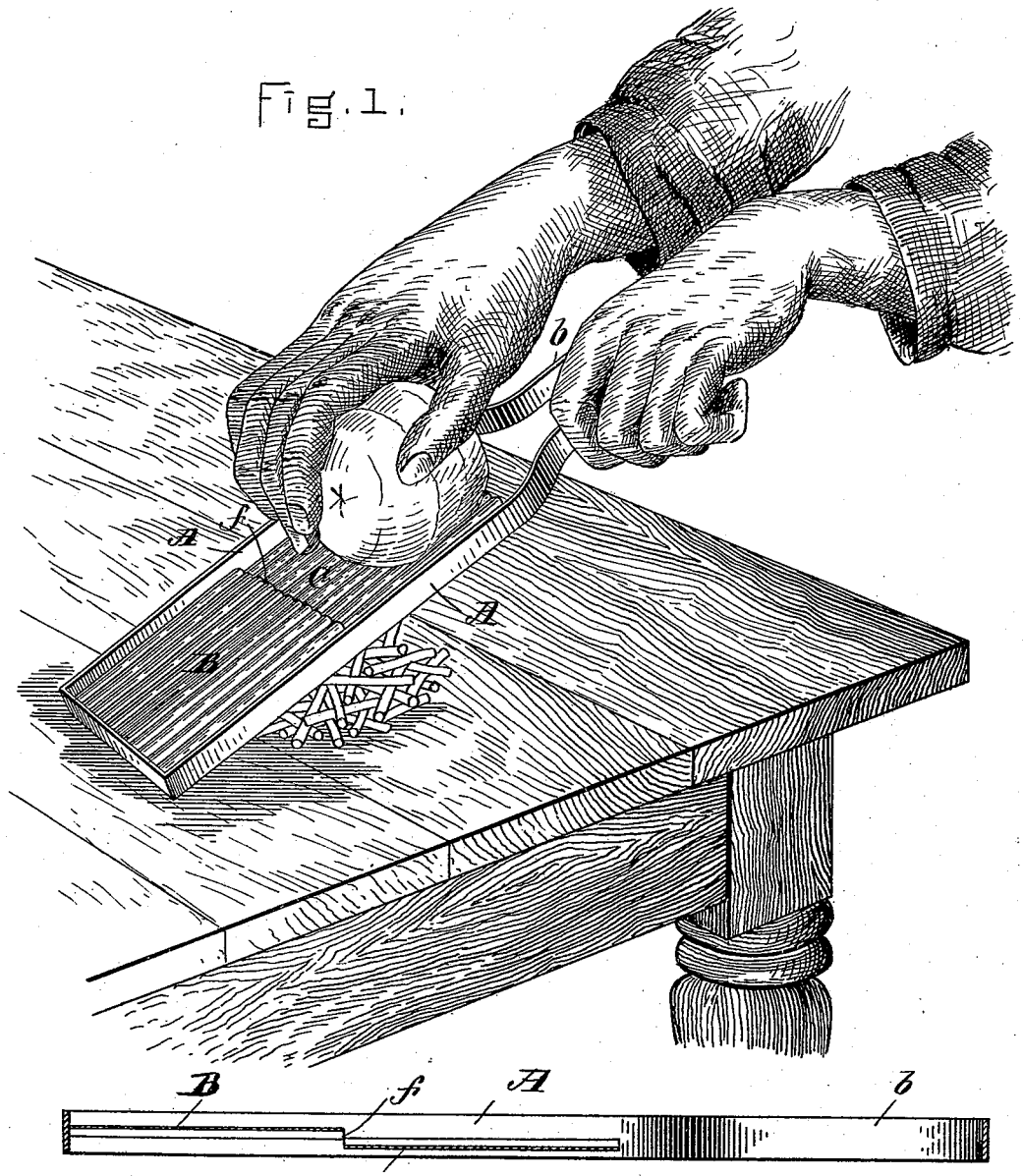

(No Model.) 2 Sheets—Sheet 2.
C. H. DANA.
FRUIT AND VEGETABLE CUTTER.

No. 446,379. Patented Feb. 10, 1891.

WITNESSES.
INVENTOR.
Charles H. Dana

UNITED STATES PATENT OFFICE.

CHARLES H. DANA, OF WEST LEBANON, NEW HAMPSHIRE.

FRUIT AND VEGETABLE CUTTER.

SPECIFICATION forming part of Letters Patent No. 446,379, dated February 10, 1891.

Application filed December 10, 1890. Serial No. 374,215. (No model.)

*To all whom it may concern:*

Be it known that I, CHARLES H. DANA, a citizen of the United States, residing at West Lebanon, in the county of Grafton and State of New Hampshire, have invented certain Improvements in Fruit and Vegetable Cutters, of which the following is a full, clear, and exact description, reference being had to the accompanying drawings, making part of this specification, in which—

Figure 1 is a perspective view of my improved fruit and vegetable cutter, illustrating the manner in which it is used. Fig. 2 is a longitudinal vertical section of the same. Fig. 3 is a transverse vertical section of the same on the line *x x* of Fig. 4. Fig. 4 is a perspective view of the implement.

My invention has for its object to provide a hand implement of simple construction, whereby fruit and vegetables can be easily and quickly cut up into narrow strips or pieces of cylindrical or other form in cross-section, in which shape they can be easily cooked, and will be found especially well adapted for use in making pies, soups, &c.

To this end my invention consists in a frame or holder provided with two corrugated plates, one forming a cutter and the other a rest or guide for the article to be cut, said plates being placed one in front of the other in such manner that the bottoms of the grooves of the cutting-plate will be in line and on a level with the tops of the ribs or corrugations of the guide-plate, thus forming a series of openings or throats between the adjacent ends of said plates, through which the fruit or vegetable is forced to cut it into narrow strips or pieces, as hereinafter set forth.

In the said drawings, A represents the frame of the implement, which is preferably composed of a flat strip of metal or a piece of thick wire bent into the required shape and provided with a portion or handle *b*, adapted to be grasped and held by the hand. Within the rectangular portion of this frame A are firmly secured two corrugated plates B C, placed one immediately in front of the other, the end of the plate B, which is adjacent to the end of the plate C, being sharpened to form a corrugated cutter, and the surface of the plate C serving as a rest or guide upon which to slide the fruit or vegetable up to and against the edge of the said corrugated cutter.

The plates B C are secured within the frame A at different levels, and are so placed with respect to each other that the bottoms of the grooves of the cutter-plate B will be in line and on a level with the tops of the ribs or corrugations of the guide-plate C, as seen in Figs. 2, 3, and 4, thus forming a series of openings or throats *f* between the adjacent ends of the two plates, through which the fruit or vegetable passes as it is slid along the surface of the guide-plate C against the sharp edge of the cutter B, which thus cuts it into narrow strips or pieces of a length corresponding to that of the surface of the fruit or vegetable slid over the guide-plate, said pieces which drop down from the under side of the implement being of a shape in cross-section corresponding to that of the throats *f* between the said corrugated plates, and it is obvious that by changing the form and size of the corrugations or grooves of said plates the shape and diameter of the pieces cut from the fruit or vegetable may be varied, as desired.

In making the first cut it will be seen that the fruit or vegetable will rest upon the tops of the ribs of the guide-plate C. Hence the pieces cut will be of a shape in cross-section corresponding to that of the upper halves of the throats or openings *f*. On the succeeding cuts, however, the ribs formed on the surface of the fruit or vegetable will fit into the grooves of the guide-plate, thus causing all of the pieces after the first cut to be of the full shape in cross-section of the throats or openings *f*, while the fitting of the grooved surface of the fruit or vegetable into the corresponding surface of the plate C will cause it to be guided in a perfectly straight line as it is slid forward and backward to make the cuts.

The above-described implement will be found extremely useful in cutting up fruit and vegetables for a variety of purposes, and will perform its work rapidly and effectively, the novelty of the shape rendering many articles so cut up very attractive for the table.

What I claim as my invention, and desire to secure by Letters Patent, is—

1. In a fruit and vegetable cutter, the combination, with a frame or holder, of two corrugated plates arranged at different levels, one in front of the other, one of said plates forming a cutter and the other a guide or rest for the article to be cut, and the adjacent ends of said plates being so arranged with respect to each other as to form throats or openings between them through which said fruit or vegetable passes as it is cut by the corrugated edges of the cutter-plate, substantially as set forth.

2. A fruit and vegetable cutter consisting of a frame or holder having two corrugated plates, one forming a cutter and the other a rest or guide for the article to be cut, said plates being placed one in front of the other with the bottoms of the grooves of the cutting-plate in line and on a level with the tops of the ribs or corrugations of the guide-plate, forming a series of openings or throats between the adjacent ends of said plates, whereby the fruit or vegetable as it passes through said throats is cut into narrow strips or pieces of a shape in cross-section corresponding to that of the openings or throats between the ends of said corrugated plates, substantially as described.

Witness my hand this 29th day of November, A. D. 1890.

CHARLES H. DANA.

In presence of—
J. L. BACON,
C. C. COLLINS.